United States Patent [19]

Vogelsang

[11] 4,095,680
[45] Jun. 20, 1978

[54] COMBINED DYNAMIC AND MECHANICAL BRAKING SYSTEM FOR AUTOMOTIVE VEHICLES

[75] Inventor: Klaus Vogelsang, Crailsheim, Germany

[73] Assignee: Voith Turbo GmbH & Co. KG, Crailsheim, Germany

[21] Appl. No.: 778,673

[22] Filed: Mar. 17, 1977

[30] Foreign Application Priority Data

Mar. 31, 1976 Germany ............................. 2613660

[51] Int. Cl.² .......................................... F16D 65/36
[52] U.S. Cl. ....................................... 188/156; 303/3
[58] Field of Search ................... 188/156, 159, 160; 303/3, 15, 16, 17

[56] References Cited

U.S. PATENT DOCUMENTS

| 2,860,737 | 11/1958 | Hines | 188/156 |
| 2,933,350 | 4/1960 | Hines | 303/3 |
| 3,488,570 | 1/1970 | Vint et al. | 188/159 X |

Primary Examiner—Duane A. Reger
Attorney, Agent, or Firm—Peter K. Kontler

[57] ABSTRACT

A braking system for automotive vehicles wherein a hydrodynamic brake normally furnishes the required braking torque in all effective positions of the brake pedal but its braking action can be supplemented or replaced by the braking force which is furnished by one or more fluid-operated mechanical friction brakes. The hydrodynamic brake is actuated only when the brake pedal is depressed sufficiently to insure that the pressure of fluid in the brake lines for the mechanical brakes at least equals that (application) pressure at which the pressurized fluid can overcome the friction-induced resistance of moving parts which serve to apply the mechanical brakes. When the speed of the vehicle is reduced to a lower limit at which the braking torque furnished by the hydrodynamic brake begins to decrease in a paraboloidal manner, the mechanical brakes can furnish, alone, a braking force which equals or closely approximates the braking torque of the hydrodynamic brake at the aforementioned lower limit of the speed and in the same position of the brake pedal. Furthermore, the braking force which is furnished by the mechanical brakes alone, in any position of the brake pedal and while the speed exceeds the aforementioned lower limit, equals or closely approximates the braking torque which is furnished by the hydrodynamic brake.

9 Claims, 2 Drawing Figures

COMBINED DYNAMIC AND MECHANICAL BRAKING SYSTEM FOR AUTOMOTIVE VEHICLES

BACKGROUND OF THE INVENTION

The present invention relates to improvements in braking systems for automotive vehicles, and more particularly to improvements in braking systems which comprise one or more dynamic brakes (preferably hydrodynamic brakes) and one or more mechanical friction brakes.

Braking systems which comprise dynamic and mechanical brakes are equipped with means for actuating the brakes (such actuating means may comprise a pivotable brake pedal) and for selecting the magnitude of the braking force, as well as with means for delaying or retarding the action of mechanical brakes. The mode of operation is such that the braking force which is furnished by mechanical brakes is reduced in response to increasing torque which is furnished by the dynamic brake or brakes, and vice versa. The aforementioned retarding means insures that the dynamic brake or brakes are actuated prior to mechanical brakes in order to protect the mechanical brakes against unnecessary wear. Whenever the braking system is in use, the sum of braking forces furnished by the dynamic and mechanical brakes should match the desired braking force. The magnitude of desired braking force is selected by the position of the input element (e.g., the aforementioned brake pedal) of the actuating means. As a rule, the actuating means comprises a single input element whose pivoting or other displacement initiates the actuation of mechanical and/or dynamic brakes.

It is well known that, as long as the speed of a vehicle (whose braking system includes mechanical and dynamic brakes) exceeds a predetermined lower limit, the braking action of a hydrodynamic brake in a given position of the pedal remains at least substantially constant even if the speed of the vehicle decreases (provided that such speed does not fall below the aforementioned predetermined lower limit). This is due to the provision of a regulating unit which automatically limits the dynamic braking force to a desired value. Such regulation of braking force can be achieved, in the case of a hydrodynamic brake, by changing the degree of filling of the working circuit through the medium of the regulating unit. However, once the speed of the vehicle decreases below the predetermined lower limit (such lower limit is reached when the working circuit of a hydrodynamic brake is filled to capacity), the braking action of a dynamic brake decreases very rapidly (the curve representing such reduction of braking action is a parabola). This is attributable to the well-known physical laws pertaining to operation of dynamic brakes and analogous apparatus.

If the braking system comprises dynamic and mechanical brakes, the mechanical brakes should take over as soon as the braking action of the dynamic brake begins to decrease as a result of deceleration of the vehicle to a speed which is less than the aforediscussed predetermined lower limit. Such action of mechanical brakes should be effected automatically, i.e., it should not be initiated by the operator of the vehicle which embodies the braking system, and the braking action of mechanical brakes should increase proportionally with reduction of the braking force which is furnished by the dynamic brake. This is achieved by the provision of the aforementioned retarding or delaying means which normally comprises a one-way valve designed to regulate the fluid pressure for operation of mechanical brakes in dependency on the braking force of the dynamic brake as well as in dependency on momentary position of the input element of the actuating means (i.e., in dependency on the desired braking force).

If the just discussed conventional braking system is incorporated in a vehicle (e.g., a road vehicle) and comprises a single dynamic brake, the dynamic brake is normally installed in such a way that it can apply braking torque to the rear axle of the vehicle. Furthermore, and for the reasons of safety, separate circuits are provided for actuation of mechanical brakes which act upon the front and rear axles of the vehicle. As regards the cooperation between the dynamic and mechanical brakes in such braking systems, one can proceed as follows:

The aforementioned retarding means influences the mechanical brakes for the front and rear axles in dependency on the braking action of the dynamic brake. In such braking systems, it happens quite frequently that the braking force is furnished by the dynamic brake alone, as long as the desired braking force does not exceed the maximum force which can be furnished by the dynamic brake alone. For example, the braking action can be supplied by the dynamic brake alone as long as the speed of the vehicle is above the aforementioned predetermined lower limit, i.e., as long as the vehicle is driven at a medium or high speed.

Alternatively, the retarding means controls only the mechanical brake or brakes for the rear axle of the vehicle, again in dependency on the condition of the dynamic brake. In such braking systems, the mechanical brakes for the front axle are invariably actuated together with the dynamic brake and, under the aforementioned circumstances, simultaneously with the dynamic brake as well as with the mechanical brake or brakes for the rear axle.

A drawback of all presently known braking systems which employ mechanical and dynamic brakes is that, even though the mechanical brakes are actuated in automatic response to a reduction of dynamic braking torque, the combined braking action is reduced to a certain extent as soon as the mechanical brakes are actuated. Such reduction of braking force must be compensated for by the operator, i.e., the input element of the actuating means must be shifted to a different position. This is undesirable for a number of reasons, especially when one and the same person drives vehicles whose braking systems include dynamic brakes as well as vehicles with braking systems which do not embody one or more dynamic brakes. Such person requires a certain period of adjustment to operation of the braking system with or without a dynamic brake. This can result in accidents, especially during the just mentioned periods of adjustment.

OBJECTS AND SUMMARY OF THE INVENTION

An object of the invention is to provide a braking system which embodies dynamic and mechanical brakes and avoids the drawbacks of the aforediscussed conventional systems in that it insures that the sum of braking forces furnished by the dynamic and mechanical brakes invariably equals or closely approximates the desired braking force.

Another object of the invention is to provide the braking system with novel and improved means for regulating the timing of actuation of the dynamic and mechanical brakes.

A further object of the invention is to provide a braking system wherein, in each position of the brake pedal, the magnitude of braking force furnished by the dynamic brake equals or closely approximates the magnitude of the braking force which can be supplied by the mechanical brakes alone.

An additional object of the invention is to provide novel and improved means for delaying or retarding the actuation of the dynamic brake in response to initial depression of the brake pedal.

The invention is embodied in a braking system for vehicles which comprises a dynamic brake (particularly a hydrodynamic brake) arranged to furnish a range of braking forces including a predetermined braking force which is furnished when the speed of the vehicle is reduced to a predetermined lower limit, at least one mechanical brake (such brake is preferably operated by a pressurized hydraulic or pneumatic fluid), means for actuating the brakes including an input element which is movable from a starting position (in which the braking system is idle) to and between a plurality of additional positions each of which corresponds to a different desired braking force, and means for retarding the actuation of the mechanical brake in dependency on the magnitude of braking force which is furnished by the dynamic brake so that the braking force which is furnished by the mechanical brake decreases in response to increasing braking force which is furnished by the dynamic brake, and vice versa. The actuating means further comprises control means for causing the mechanical brake to furnish, alone, a braking force which equals or at least approximates the predetermined braking force of the dynamic brake when the speed of the vehicle is reduced to the aforementioned lower limit while the position of the input element (e.g., a brake pedal) remains substantially unchanged. This insures that the operator of the vehicle does not feel or discern the transition from braking action which is furnished by the dynamic brake alone to braking action which is furnished by the dynamic and mechanical brakes or vice versa.

The control means preferably includes means for causing the mechanical brake to furnish, alone, a braking force which at least approximates the braking force furnished by the dynamic brake within the full range of braking forces for each additional position of the input element.

The novel features which are considered as characteristic of the invention are set forth in particular in the appended claims. The improved braking system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
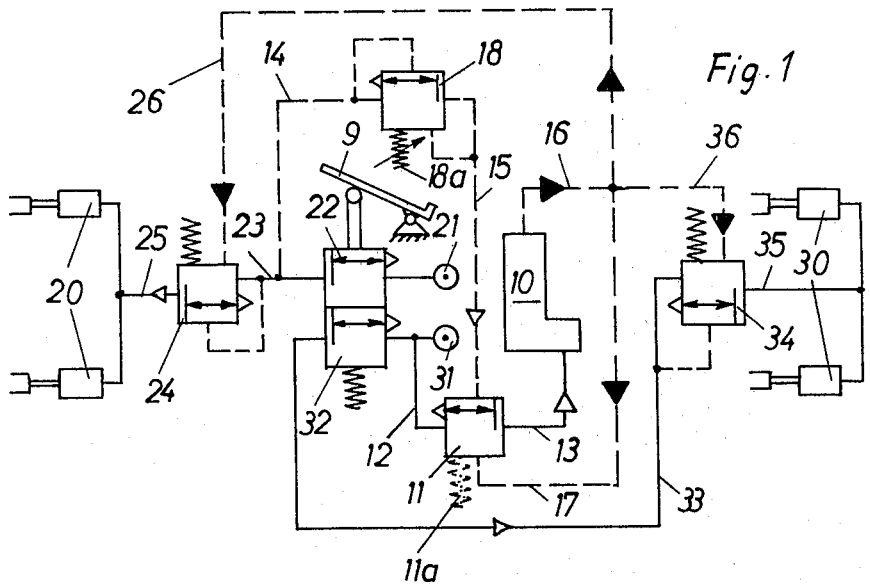
FIG. 1 is diagrammatic view of a braking system which embodies one form of the invention and comprises a single hydrodynamic brake as well as several mechanical brakes.

FIG. 1 shows a braking system for an automotive vehicle. The braking system comprises a suitable hydrodynamic brake 10 and four friction brakes or mechanical brakes each of which is a pneumatically operated brake. The drawing merely shows two front wheel cylinders 20 and two rear wheel cylinders 30. The actuating means of the braking system comprises two discrete sources 21 and 31 of pressurized fluid, two discrete pressure selecting brake valves 22, 32, and a mobile input element 9 here shown as a pivotable brake pedal. The outlet of the brake valve 22 is connected with the front wheel cylinders 20 by a pneumatic brake line 23, 25 which contains a first retarding means here shown as a hydropneumatic valve 24. The outlet of the brake valve 32 is connected with the rear wheel cylinders 30 by a pneumatic brake line 33, 35 which contains a second retarding means in the form of a second hydropneumatic valve 24.

The actuating means of the braking system further comprises a regulating valve 11 for the hydrodynamic brake 10. In the embodiment of FIG. 1, the valve 11 is connected to the source 31 by a conduit 12; however, it is equally within the purview of the invention to connect the conduit 12 with a discrete source of pressurized fluid. The connection between the regulating valve 11 and the hydrodynamic brake 10 comprises a further conduit 13. The pressure in the conduit 13 determines the degree of filling of the working circuit of the brake 10 with working fluid; such pressure is a function of several variables including the desired braking force (i.e., the selected position of the brake pedal 9). The position of the pedal 9 further determines the pressure of fluid in the brake line section 23; such pressure is transmitted to the corresponding port of the regulating valve 11 by way of two control pipes 14, 15 which are connected to each other by a control valve 18 constituting a pressure reducing valve. Thus, the selected position of the pedal 9 is reflected by pressure in the control pipe 15, and such pressure influences the pressure in the conduit 13 and hence the degree of filling of the working circuit of the hydrodynamic brake 10. The pressure in the control pipe 15 can be said to constitute a reference pressure. The pressure of fluid in the conduit 13 (and hence the degree of filling of the working circuit of the brake 10) further depends from the magnitude of braking torque which is furnished by the brake 10. The magnitude of such torque can be detected by monitoring the pressure of hydraulic working fluid in the brake 10; the monitored pressure is communicated to the regulating valve 11 by way of control pipes or connecting conduits 16 and 17 the latter of which is connected to the corresponding port of the regulating valve 11. The just described arrangement insures that the brake 10 can furnish an at least substantially constant hydrodynamic braking torque at a selected position of the brake pedal 9 and within the entire speed range above the aforementioned lower limit. As mentioned above, the magnitude of such braking torque is represented by the pressure of hydraulic fluid in the conduit 16 which communicates with the working circuit of the brake 10. The conduit 16 is further connected with control pipes 26, 36 which are respectively connected with the retarding valves 24, 34. This enables the valves 24, 34 to respectively prevent the flow of brake fluid from the brake line sections 23 and 33 to the brake line sections 25 and 35 as long as the hydrodynamic brake 10 is capable of furnishing the required braking force without any assistance from the mechanical brakes. However, when the working circuit of the brake 10 is filled to capacity (i.e., when the speed of the vehicle is reduced to a predetermined lower limit) and the speed of the vehicle decreases still further so that the curve representing the reduction of hydrodynamic braking torque resembles a parabola, the retarding valves 24 and 34 respectively connect the brake line sections 23, 33 with the brake line sections 25 and 35 to thereby initiate the application of mechanical brakes (cylinders 20 and 30).

It is important to insure that the sum of all braking forces, i.e., the remaining braking force furnished by the hydrodynamic brake 10 plus the braking force furnished by the mechanical brakes, should equal the magnitude of braking force which was furnished by the brake 10 alone prior to opening of the retarding valves 24 and 34. Such function is performed by the control valve 18 between the pipes 14 and 15. This valve can reduce the pressure of fluid in the control pipe 15 so that such pressure is less than that in the control pipe 14 and brake line section 23. The extent to which the control valve 18 reduces the pressure of fluid in the pipe 15 can be selected by appropriate adjustment of a valve spring 18a which acts upon the piston, spool or an analogous valve element of the valve 18. In accordance with a feature of the invention, the pressure differential between the control pipes 14 and 15 should equal or at least approximate that pressure (the so-called application pressure) which is needed for the application of the mechanical brakes.

The operation of the control valve 18 is as follows:

When the brake pedal 9 is pivoted through a given angle from its starting position so that the pressure of fluid in the sections 23, 25 and 33, 35 of the two brake lines rises to a corresponding value (it will be noted that the depression of pedal 9 results in establishment of connections between the sources 21, 31 and the respective sections 23, 33 of the two brake lines), the valve 18 allows the control pipe 14 to communicate with the control pipe 15 not before the pressure in the brake line section 23 (and hence in the control pipe 14) rises sufficiently to match the aforementioned application pressure. The regulating valve 11 opens a passage for the flow of fluid from the conduit 12 to the conduit 13 not before the control pipe 15 communicates with the control pipe 14 (i.e., when the pressure in the brake line section 23 matches or exceeds the application pressure). Thus, the hydrodynamic brake 10 is actuated not before the pressure of brake fluid in the section 23 reaches the application pressure. In other words, the control valve 18 causes a shifting of the operating range of the hydrodynamic brake 10 so that the lower limit of such range and the lower limit of the operating range of the mechanical brakes (represented by the cylinders 20 and 30) are reached substantially in the same position of the brake pedal 9.

As a rule, a hydrodynamic brake (the brake 10 is assumed to be a hydrodynamic brake) furnishes a readily detectable (i.e., rather pronounced) minimum braking torque as soon as it is actuated in response to opening of a passage or path for the flow of fluid from the source 31, via conduit 12, valve 11 and conduit 13. Therefore, the operating range of the hydrodynamic brake 10 is preferably shifted to such an extent that the control valve 18 opens a passage for the flow of fluid from the control pipe 14 to the control pipe 15 not before the pressure in the brake line sections 23 and 33 is sufficiently high to insure that the mechanical brakes can furnish a braking force which matches the minimum braking torque furnished by the brake 10, provided, of course, that the valves 24 and 34 do not prevent the actuation of mechanical brakes. By varying the pressure reducing action of the control valve 18 (i.e., by replacing the valve spring 18a with a spring having another characteristic), one can insure that (in all or nearly all positions of the brake pedal 9), the torque which is furnished by the brake 10 equals the torque which would be furnished by the mechanical brakes if the mechanical brakes were applied alone, i.e., if the mechanical brakes were applied while the braking torque furnished by the brake 10 is nil (provided, of course, that the speed of the vehicle falls below the aforementioned lower limit).

FIG. 1 further shows a modified control device which can be used as a substitute for the pressure reducing control valve 18. The modified control device includes a valve spring 11a for the regulating valve 11. This spring acts upon the piston or spool (i.e., the mobile valve element) of the valve 11 in a direction to oppose the action of fluid in the control pipe 15. The latter is then in permanent communication with the brake line section 23, i.e., the valve 18 can be omitted. In other words, the spring 11a biases the valve element of the valve 11 in a first direction, and the fluid in the control pipe 15 biases the valve element in the opposite direction. The bias of the spring 11a must be strong enough to insure that the regulating valve 11 opens a passage for the flow of fluid from the conduit 12 into the conduit 13 not before the pressure of fluid in the brake line section 23 (and hence in the control pipe 15) reaches the aforementioned application pressure.

Figure 2:
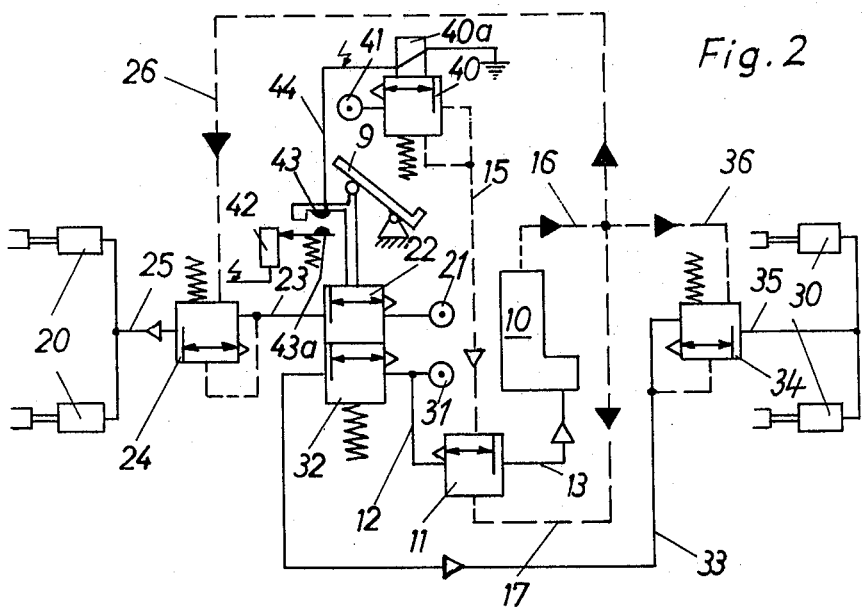
FIG. 2 is a similar view of a modified braking system.

FIG. 2 shows a further braking system wherein all such parts which are identical with or clearly analogous to corresponding parts of the system of FIG. 1 are denoted by similar reference characters. In this embodiment of the invention, the control pipe 15 is not connected or connectable with the brake line section 23; instead, the brake system of FIG. 2 comprises a discrete source 41 of pressurized fluid which can admit fluid into the control line 15 in response to opening of a solenoid-operated electrohydraulic or electropneumatic control valve 40 which constitutes a signal converter. The source 41 may contain pressurized hydraulic or pneumatic fluid. The solenoid 40a of the valve 40 is in circuit with a source of reference signals including a variable resistor 42 which is adjustable by the brake pedal 9 and is connected to the positive pole of a source of electrical energy. One end of the winding of the solenoid 40a is grounded. The circuit is completed in response to such depression of the brake pedal 9 that the latter causes a movable contact 43 of an electric switch to engage a second contact 43a which is connected with the wire of the variable resistor 42. The switch 43, 43a is closed in response to a predetermined depression or pivoting of the brake pedal 9; if the brake pedal 9 is depressed beyond such position, the resistance of the resistor 42 is reduced accordingly and the valve 40 increases the pressure of fluid in the control line 15 so that the regulating valve 11 permits a larger quantity of fluid to flow from the conduit 12 into the conduit 13. The extent of depression of the pedal 9 in order to close the switch 43, 43a can be readily selected in such a way that the closing of switch 43, 43a takes place when the pressure of fluid in the brake line section 23 reaches the aforementioned application pressure. The connection between the contact 43 and the solenoid 40a comprises conductor means 44.

Hydrodynamic brakes which can be used in the braking system of the present invention are described and shown, for example, in the April 1974 edition of VDI-Richtlinien (VDI- 2153) published by the VDI-Verlag GmbH, Dusseldorf, Federal Republic Germany.

It has been observed that, in presently known braking systems of the type utilizing a dynamic brake and mechanical brakes, the dynamic brake responds practically instantaneously in response to any, even minute depression of the brake pedal when the speed of the vehicle is so low that the characteristic curve of braking action of the dynamic brake is in the aforediscussed paraboloidal range. However, the mechanical brakes are applied with a certain delay. It has been found that such delay in the actuation of mechanical brakes is attributable to friction between mechanical components (including bearings for mobile parts, pistons in brake cylinders and others) which apply the mechanical brakes in response to depression of the pedal. Consequently, a certain force is necessary in order to overcome such friction, i.e., to set in motion the means which serve to apply the mechanical brakes. In other words, the pressure of fluid which is admitted into fluid-operated mechanical brakes (one can safely assume that all mechanical brakes which are presently used in the braking systems for automotive vehicles are operated by a pneumatic and/or hydraulic fluid) in response to slight depression of the brake pedal does not suffice to insure the application of mechanical brakes. It is invariably necessary to raise the pressure of fluid to the aforediscussed application pressure before the mechanical brakes begin to respond.

Consequently, and when the speed of the vehicle is sufficiently low to reduce the braking action of the dynamic brake in a conventional braking system to within the paraboloidal range, the braking force furnished by the mechanical brakes is less than that which is necessary in addition to the greatly reduced braking force furnished by the dynamic brake in order to insure that the combined braking force will match that which is expected in response to depression of the pedal to a selected position. As mentioned above, the mechanical brakes are likely to remain inactive when the desired braking force is relatively small so that the extent of displacement of the pedal from its undepressed or starting position is too small to insure that the pressure of fluid in the brake lines for the mechanical brakes equals or exceeds the application pressure. Furthermore, and even if the extent of depression of the pedal is sufficient to raise the pressure in the brake lines above the application pressure, the difference between actual pressure and application pressure is insufficient to enable the mechanical brakes to furnish a braking force which suffices to produce a desired braking action when the braking torque of the dynamic brake is greatly reduced at a low speed of the vehicle.

If the dynamic brake is a hydrodynamic brake, one must further consider the fact that, as a rule, the lowest braking torque of such brake is already quite pronounced. Therefore, the failure of mechanical brakes to become engaged when they are expected to supplement the braking action of the hydrodynamic brake is even more likely to present serious problems.

Experiments with the improved braking system have shown that such system fully overcomes the aforediscussed drawbacks of conventional systems. In other words, the dynamic brake should become effective not before the pedal is moved to a position in which the pressure of fluid in the brake line sections 23, 33 already equals the application pressure, i.e., not before the mechanical brakes (if actuated alone, namely, in the absence of any braking torque produced by the dynamic brake) can furnish a braking force which equals or at least approximates the minimum dynamic braking torque. Stated otherwise, the braking force supplied by the mechanical brakes at a speed only slightly above zero speed, and at a selected position of the brake pedal, must equal or closely approximate the dynamic braking force at a medium or high speed of the vehicle and at the same position of the brake pedal. Such requirement is fully met by the improved braking system when the pedal is moved to a position in which the dynamic brake furnishes the lowest braking torque. This insures that, if the speed of the vehicle decreases so that the braking torque which is furnished by the dynamic brake decreases abruptly in the aforediscussed (paraboloidal) manner, the mechanical brakes are applied without fail and thus replace or fully complement the terminated or rapidly dwindling dynamic braking torque. This takes place even if the driver of the vehicle decides to select a very small braking force.

It is preferred to construct the improved braking system in such a way that the just discussed conditions prevail within the entire range of braking forces furnished by the dynamic brake. In other words, in a diagram wherein the positions of the brake pedal are plotted along the abcissa and the braking force is measured along the ordinate, a curve representing variations of hydrodynamic braking torque should coincide with or closely approximate the curve representing variations of braking force which would be furnished by the mechanical brakes if they were applied alone. It has been found that such adjustment of the braking system insures that the driver does not discern the transition from braking with the dynamic brake to braking with dynamic and mechanical brakes, or vice versa.

The aforedescribed requirements are fully met by the braking systems which are shown in FIGS. 1 and 2, i.e., by insuring that the dynamic brake 10 is applied only when the pedal 9 is already moved to a position in which the fluid pressure in the brake line sections 23, 33 equals the application pressure and the mechanical brakes can furnish a braking force which equals the minimum dynamic braking torque.

The same result can be achieved by resorting to a pressure amplifier (not shown) which insures that, when the pedal is depressed to the extent which is needed for actuation of the dynamic brake, the mechanical brakes are in a position to furnish a braking force which equals or closely approximates the minimum dynamic braking torque.

The solutions which are shown in FIGS. 1 and 2 are preferred at this time because they are simpler and also because they can be incorporated in existing mechanical braking systems by the simple expedient of adding a dynamic brake and the appurtenant control and regulating elements.

As utilized in this specification and in the appended claims, the term "mechanical brake or brakes" is intended to denote that brake or those brakes which are actuated (in response to opening of one or more retarding means, such as the valves 24 and 34) when the braking torque furnished by the dynamic brake is reduced to a predetermined minimum value or when the maximum braking torque furnished by the dynamic brake is insufficient to supply a desired braking force. However, it is to be understood that a vehicle which embodies the improved braking system can further include one or more mechanical (friction) brakes which can be actuated independently of the dynamic brake or brakes, i.e., whose actuation does not require an opening of the valve 24 and/or 34.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. A braking system for vehicles, comprising a dynamic brake, particularly a hydrodynamic brake arranged to furnish a range of braking forces including a predetermined minimum braking force; at least one mechanical brake; means for actuating said brakes, including as input element movable from a starting position to and between a plurality of additional positions each corresponding to a different braking force, one of said positions being that in which said dynamic brake furnishes a minimum braking force; and means for retarding the actuation of said mechanical brake in dependency on the magnitude of braking force furnished by said dynamic brake so that the braking force furnished by said mechanical brake decreases in response to increasing braking force furnished by said dynamic brake and vice versa and said mechanical brake is applied only when the braking force furnished by said dynamic brake is insufficient, said actuating means further including control means for causing said mechanical brake to furnish, when actuated alone while said input element assumes said one position, a braking force which at least approximates said predetermined minimum braking force furnished by said dynamic brake.

2. A braking system as defined in claim 1, wherein said control means includes means for causing said mechanical brake to furnish, when actuated alone, a braking force which at least approximates the braking force furnished by said dynamic brake in each additional position of said input element.

3. A braking system as defined in claim 1, wherein said mechanical brake is operated by pressurized fluid and the actuation of said mechanical brake necessitates the application of a predetermined minimum fluid pressure, and further comprising a source of pressurized fluid and a brake line connecting said source with said mechanical brake, said actuating means further comprising a brake valve adjustable by said input element and installed between said source and said brake line to supply to said brake line fluid at a pressure which varies in response to changes in the position of said input element, said control means being arranged to effect actuation of said dynamic brake in response to a rise of fluid pressure in said brake line to said minimum pressure.

4. A braking system as defined in claim 3, wherein said control means includes a source of reference signals and means for connecting said source with said dynamic brake in response to movement of said input element to that additional position in which the pressure of fluid in said brake line at least approximates said minimum pressure.

5. A braking system as defined in claim 4, wherein said source of reference signals includes an electric switch which is closed in response to movement of said input element to said last mentioned additional position.

6. A braking system is defined in claim 1, wherein said mechanical brake is operated by pressurized fluid and the actuation of said mechanical brake necessitates the application of a predetermined minimum fluid pressure, and further comprising a source of pressurized fluid and a brake line connecting said source with said mechanical brake, said control means comprising amplifier means for raising the pressure of fluid in said brake line to said minimum pressure in response to any, even minimal movement of said input element from said starting position.

7. A braking system as defined in claim 1, comprising a plurality of mechanical brakes.

8. A braking system as defined in claim 1, wherein said dynamic brake is a hydrodynamic brake having a working chamber for working fluid, said chamber being filled to capacity when the speed of the vehicle is reduced to said lower limit whereupon the braking force furnished by said hydrodynamic brake decreases abruptly in response to further reduction of said speed.

9. A braking system as defined in claim 1, wherein said actuating means further comprises an adjustable regulating valve for said dynamic brake, said regulating valve having a mobile valve element and said control means comprising means for yieldably biasing said valve element in one direction, said mechanical brake being operated by pressurized fluid and the actuation of said mechanical brake necessitating the application of a predetermined minimum fluid pressure, said control means further comprising means for admitting to said regulating valve pressurized fluid in a direction to move said valve element against the opposition of said biasing means and to thus initiate the actuation of said dynamic brake in response to a rise of fluid pressure to said minimum pressure.

* * * * *